(12) United States Patent
Jao et al.

(10) Patent No.: US 9,258,857 B2
(45) Date of Patent: *Feb. 9, 2016

(54) LIGHT EMITTING SYSTEM AND VOLTAGE CONVERSION DEVICE THEREOF

(71) Applicant: RICHTEK TECHNOLOGY CORP., Zhubei (TW)

(72) Inventors: Tong-Cheng Jao, Taichung (TW); Yi-Wei Lee, Taipei (TW); Isaac Y. Chen, Zhubei (TW)

(73) Assignee: RICHTEK TECHNOLOGY CORP., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,574

(22) Filed: Jul. 17, 2014

(65) Prior Publication Data

US 2015/0048750 A1 Feb. 19, 2015

(30) Foreign Application Priority Data

Aug. 14, 2013 (TW) .............................. 102129126 A

(51) Int. Cl.
| | |
|---|---|
| H05B 33/08 | (2006.01) |
| H05B 41/34 | (2006.01) |
| H05B 39/09 | (2006.01) |
| H02M 7/217 | (2006.01) |
| H02M 1/00 | (2007.01) |

(52) U.S. Cl.
CPC ......... *H05B 33/0815* (2013.01); *H02M 7/2176* (2013.01); *H05B 33/0812* (2013.01); *H02M 2001/0045* (2013.01)

(58) Field of Classification Search
CPC ........... H05B 33/0815; H05B 33/0803; H05B 41/34; H05B 39/09; H02M 7/2176

USPC .................................................. 315/200 R, 36
See application file for complete search history.

(56) References Cited

U.S. PATENT DOCUMENTS

| | | | |
|---|---|---|---|
| 8,143,800 B2 | 3/2012 | Liu | |
| 2011/0121740 A1 | 5/2011 | Shih | |
| 2012/0223644 A1* | 9/2012 | Wang ................. | H05B 33/0887 315/127 |
| 2014/0062319 A1* | 3/2014 | Huang ............... | H05B 33/0815 315/186 |
| 2014/0265892 A1* | 9/2014 | Chang ................ | H05B 33/0812 315/187 |
| 2015/0048750 A1* | 2/2015 | Jao ..................... | H05B 33/0815 315/200 R |
| 2015/0115815 A1* | 4/2015 | Huang ............... | H05B 33/0815 315/191 |

FOREIGN PATENT DOCUMENTS

| | | |
|---|---|---|
| TW | 201208471 | 2/2012 |
| TW | I384903 | 2/2013 |
| TW | I403217 | 7/2013 |

* cited by examiner

*Primary Examiner* — Dylan White
(74) *Attorney, Agent, or Firm* — Ladas & Parry, LLP

(57) ABSTRACT

A light emitting system includes a series connection of a light emitting unit and a variable current source, and a voltage conversion device that includes a rectifier circuit and an output circuit. The rectifier circuit rectifies an AC voltage to generate a rectified voltage across a first rectifier output coupled to one end of the series connection of the light emitting unit and the variable current source, and a second rectifier output. The output circuit is coupled between the second rectifier output and another end of the series connection of the light emitting unit and the variable current source, and is configured to generate a direct-current (DC) output voltage.

11 Claims, 7 Drawing Sheets

US 9,258,857 B2

LIGHT EMITTING SYSTEM AND VOLTAGE CONVERSION DEVICE THEREOF

CROSS-REFERENCE TO RELATED APPLICATION

This application claims priority to Taiwanese Application No. 102129126, filed on Aug. 14, 2013.

BACKGROUND OF THE INVENTION

1. Field of the Invention

The invention relates to a light emitting system and a voltage conversion device.

2. Description of the Related Art

Referring to FIG. 1, a conventional light emitting system 1 is shown to include a voltage conversion device 11, a processor 12, a variable current source 13 and a light emitting diode (LED) unit 14. The voltage conversion device 11 is coupled to an alternating-current (AC) power source 10 for receiving an AC voltage, and converts the AC voltage into a direct-current (DC) voltage Vo serving as a working voltage of the processor 12. The processor 12 generates an adjustment signal according to the DC voltage Vo. The variable current source 13 is coupled between the processor 12 and a ground node, and receives the adjustment signal from the processor 12, so as to generate a driving current Io for driving the LED unit 14. The voltage conversion device 11 includes a rectifier circuit 15, a voltage reducing circuit 16 and an output circuit 17.

The rectifier circuit 15 is coupled to the AC power source 10 for receiving the AC voltage, and has a first rectifier output O1 coupled to the LED unit 14, and a second rectifier output O2. The rectifier circuit 15 rectifies the AC voltage, and generates a rectified voltage VRE across the first and second rectifier outputs O1, O2.

The voltage reducing circuit 16 is coupled to the first and second rectifier outputs O1, O2 for receiving the rectified voltage VRE, and has an output O3 that provides a reduced voltage associated with the rectified voltage VRE.

The output circuit 17 is coupled between the output O3 of the voltage reducing circuit 16 and the second rectifier output O2 for receiving the reduced voltage, so as to generate the DC output voltage Vo that is provided to the processor 12.

Such a conventional light emitting system 1 has the following drawbacks:

1. High power consumption and short service life: Since the rectified voltage VRE is mainly across the voltage reducing circuit 16, the voltage reducing circuit 16 may be easily damaged due to high power consumption, resulting in a short service life.

2. Low conversion efficiency: Since the rectified voltage VRE is mainly across the voltage reducing circuit 16, the DC output voltage Vo that is outputted by the output circuit 17 according to the reduced voltage may be limited, resulting in low conversion efficiency.

3. Waste of current: Since the variable current source 13 is grounded, the driving current Io directly flows to the ground, resulting in waste of current.

SUMMARY OF THE INVENTION

Therefore, an object of the present invention is to provide a light emitting system that may have relatively low power consumption and a relatively long service life.

According to one aspect of the present invention, a light emitting system comprises:

a series connection of a light emitting unit and a variable current source, the variable current source being disposed to receive an adjustment signal and generating a driving current to drive the light emitting unit according to the adjustment signal; and a voltage conversion device including:

a rectifier circuit disposed to receive an alternating-current (AC) voltage, and having a first rectifier output coupled to one end of the series connection of the light emitting unit and the variable current source, and a second rectifier output, the rectifier circuit being configured to rectify the AC voltage for generating a rectified voltage across the first rectifier output and the second rectifier output; and an output circuit coupled between the second rectifier output and another end of the series connection of the light emitting unit and the variable current source, having an input disposed to receive an input voltage associated with a difference between the rectified voltage and a voltage across the series connection of the light emitting unit and the variable current source, and configured to generate a direct-current (DC) output voltage according to the input voltage.

Another object of the present invention is to provide a voltage conversion device that may have relatively low power consumption and a relatively long service life.

According to another aspect of the present invention, a voltage conversion device comprises:

a rectifier circuit disposed to receive an alternating-current (AC) voltage, having a first rectifier output and a second rectifier output, and configured to rectify the AC voltage for generating a rectified voltage across the first rectifier output and the second rectifier output;

a voltage reducing circuit coupled between the first rectifier output and the second rectifier output for receiving the rectified voltage, having an output, and configured to generate at the output thereof a reduced voltage associated with the rectified voltage;

an output circuit having an input disposed to receive an input voltage, and configured to generate a direct-current (DC) output voltage according to the input voltage;

a switch coupled between the output of the voltage reducing circuit and the input of the output circuit, and configured to make or break electrical connection between the output of the voltage reducing circuit and the input of the output circuit; and a control circuit coupled to the switch and the rectifier circuit, and configured to control the switch to break electrical connection when the rectified voltage is greater than a first value.

According to yet another aspect of the present invention, a voltage conversion device comprises:

a rectifier circuit disposed to receive an alternating-current (AC) voltage, having a first rectifier output and a second rectifier output, and configured to rectify the AC voltage for generating a rectified voltage across the first rectifier output and the second rectifier output;

a voltage reducing circuit coupled between the first rectifier output and the second rectifier output for receiving the rectified voltage, having an output, and configured to generate at the output thereof a reduced voltage associated with the rectified voltage;

an output circuit having an input disposed to receive an input voltage, and configured to generate a direct-current (DC) output voltage according to the input voltage;

a switch coupled between the output of the voltage reducing circuit and the input of the output circuit, and configured to make or break electrical connection between the output of the voltage reducing circuit and the input of the output circuit; and a control circuit coupled to the first rectifier output and the second rectifier output for receiving the rectified voltage, and coupled to the switch for controlling the switch to make or break electrical connection between the output of the voltage reducing circuit and the input of the output circuit according to the rectified voltage and a predetermined reference voltage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
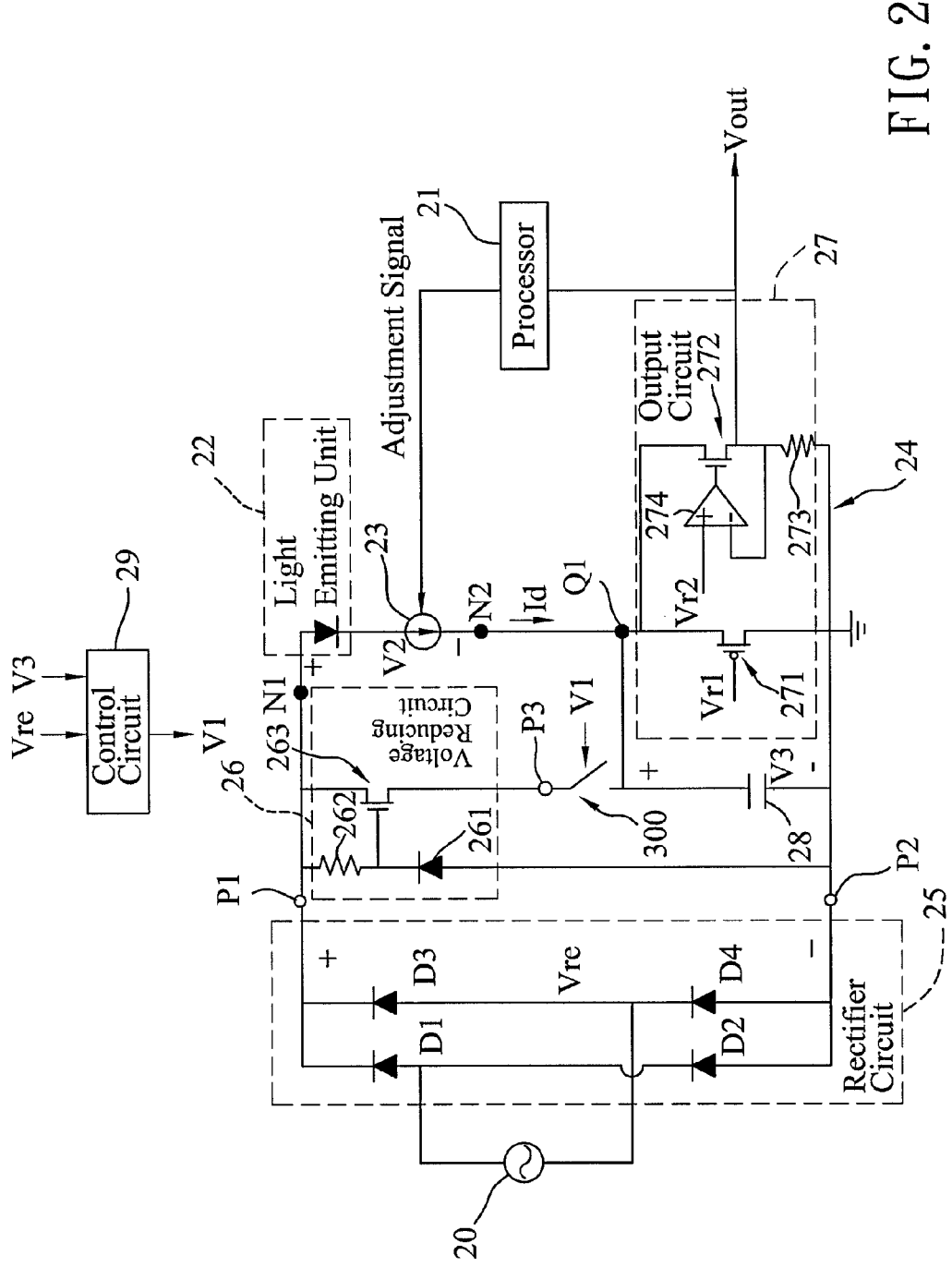
FIG. 2 is a schematic circuit diagram illustrating a first preferred embodiment of a voltage conversion device of a light emitting system according to the present invention.

FIG. 2 shows a light emitting system including a processor 21, a series connection of a light emitting unit 22 (e.g., a light emitting diode unit) and a variable current source 23, and a first preferred embodiment of a voltage conversion device 24 according to the present invention. The light emitting system is adapted to receive an alternating-current (AC) voltage from an AC power source 20, and converts the AC voltage into a direct-current (DC) output voltage Vout.

The processor 21 receives the DC output voltage Vout as a working voltage, and generates an adjustment signal for adjusting a driving current Id outputted by the variable current source 23.

The variable current source 23 is coupled to the processor 21 for receiving the adjustment signal, and generates, according to the adjustment signal, the driving current Io to drive the light emitting unit 22. In this embodiment, the driving current Id is proportional to magnitude of the adjustment signal, and the light emitting unit 22 includes a light emitting diode, but the present invention is not limited thereto.

The voltage conversion device 24 includes a rectifier circuit 25, a voltage reducing circuit 26, a switch 300, an output circuit 27, a capacitor 28 and a control circuit 29.

The rectifier circuit 25 is coupled to the AC power source 20 for receiving the AC voltage, has a first rectifier output P1 coupled to one end (denoted as a node N1) of the series connection of the light emitting unit 22 and the variable current source 23, and a second rectifier output P2, and rectifies the AC voltage for generating a rectified voltage across the first rectifier output P1 and the second rectifier output P2. In this embodiment, the rectifier circuit 25 is a full-wave bridge rectifier including four diodes D1~D4, and the second rectifier output P2 is grounded. Each of the diodes D1-D4 has an anode and a cathode. The cathodes of the diodes D1, D3 are coupled together to serve as the first rectifier output P1, and the anodes of the diodes D2, D4 are coupled together to serve as the second rectifier output P2.

The voltage reducing circuit 26 is coupled to the first and second rectifier outputs P1, P2 for receiving the rectified voltage Vre, has an output (denoted as a node P3) that provides a reduced voltage associated with the rectified voltage Vre, and includes a diode 261, a resistor 262, and a transistor 263.

The diode 261 has an anode coupled to the second rectifier output P2, and a cathode. The resistor 262 is coupled between the first rectifier output P1 and the cathode of the diode 261. The transistor 263 includes a first terminal coupled to the first rectifier output P1, a second terminal serving as the output of the voltage reducing circuit 26 (i.e., the node P3), and a control terminal coupled to the cathode of the diode 261.

The switch 300 is coupled between the output P3 of the voltage reducing circuit 26 and an input of the output circuit 27 (denoted as a node Q1) that is also coupled to another end (denoted as a node N2) of the series connection of the light emitting unit 22 and the variable current source 23. The switch 300 is responsive to a switch signal V1 to make or break electrical connection between the node P3 and the node Q1. When the switch 300 makes electrical connection, the output circuit 27 receives at the node Q1 an input voltage associated with a difference between the rectified voltage Vre and a voltage V2 between the nodes N1 and N2, and generates the DC output voltage Vout according to the input voltage. The DC output voltage Vout is provided to the processor 21. The output circuit 27 includes a first transistor 271, a second transistor 272, a resistor 273 and an operational amplifier 274.

The first transistor 271 has a first (non-inverting) terminal serving as the input of the output circuit 27 (i.e., the node Q1), a second (inverting) terminal coupled to the second rectifier output P2, and a control terminal receiving a first voltage Vr1.

The operational amplifier 274 has a first input receiving a second voltage Vr2, a second input, and an output.

The second transistor 272 has a first terminal coupled to the first terminal of the first transistor 271, a second terminal coupled to the second input of the operational amplifier 274, and a control terminal coupled to the output of the operational amplifier 274.

The resistor 273 is coupled between the second terminal of the second transistor 272 and the second rectifier output P2.

The DC output voltage Vout is outputted at the second terminal of the second transistor 272.

The capacitor 28 is coupled between the node Q1 and the second rectifier output P2.

The control circuit 29 is coupled to the rectifier circuit 25 and the capacitor 28 for respectively receiving the rectified voltage Vre and a voltage V3 across the capacitor 28, and is configured to output the switch signal V1 for controlling the switch 300 to make or break connection in a manner to be described hereinafter.

State I: When the rectified voltage Vre is not greater than a first value and the voltage V3 is not greater than a second value, the control circuit 29 controls the switch 300 to make electrical connection. The first value is a threshold voltage value that causes the light emitting unit 22 to allow/block current flow in a forward direction (i.e., a forward voltage of the light emitting unit 22). The second value is a voltage value that enables/disables the output circuit 27 to generate the DC output voltage Vout, and that is set via circuit design as required.

At this time, the input voltage at the node Q1 is equal to the reduced voltage outputted by the voltage reducing circuit 26 at the node P3. The output circuit 27 generates the DC output voltage Vout according to the reduced voltage, and the capacitor 28 is charged according to the reduced voltage.

State II: When the rectified voltage Vre is not greater than the first value, and the voltage V3 is greater than the second value, the control circuit 29 controls the switch 300 to break electrical connection.

At this time, the capacitor 28 discharges via the output circuit 27, so that the input voltage at the node Q1 is equal to the voltage V3, and the output circuit 27 generates the DC output voltage Vout according to the voltage V3 across the capacitor 28. Meanwhile, the light emitting unit 22 does not emit light at this state.

State III: When the rectified voltage Vre is greater than the first value, the control circuit 29 controls the switch 300 to break electrical connection.

At this time, a portion of the driving current Id flows into the output circuit 27, and another portion of the current Id flows into the capacitor 28. The output circuit 27 receives the input voltage associated with the difference between the rectified voltage Vre and the voltage V2, and generates the DC output voltage Vout accordingly. The capacitor 28 is charged according to the difference between the rectified voltage Vre and the voltage V2.

Compared to the aforementioned conventional light emitting system 1, since the switch 300 of the first preferred embodiment is controlled to make electrical connection only at state I, damage issue of the voltage reducing circuit 26 that results from high power consumption may be alleviated, so as to prolong the service life of the voltage conversion device 24. In addition, since the output circuit 27 receives the input voltage at the node Q1 that is coupled to the capacitor 28 and the node N2, the output circuit 27 may provide to the processor 21 a greater DC output voltage Vout compared to that generated by the conventional light emitting system 1, thereby promoting conversion efficiency of the voltage conversion device 24. Furthermore, since the driving current Id flows into the output circuit 27 and the capacitor 28 instead of flowing directly to the ground as taught in the conventional light emitting system 1, waste of current may be prevented.

Figure 3:
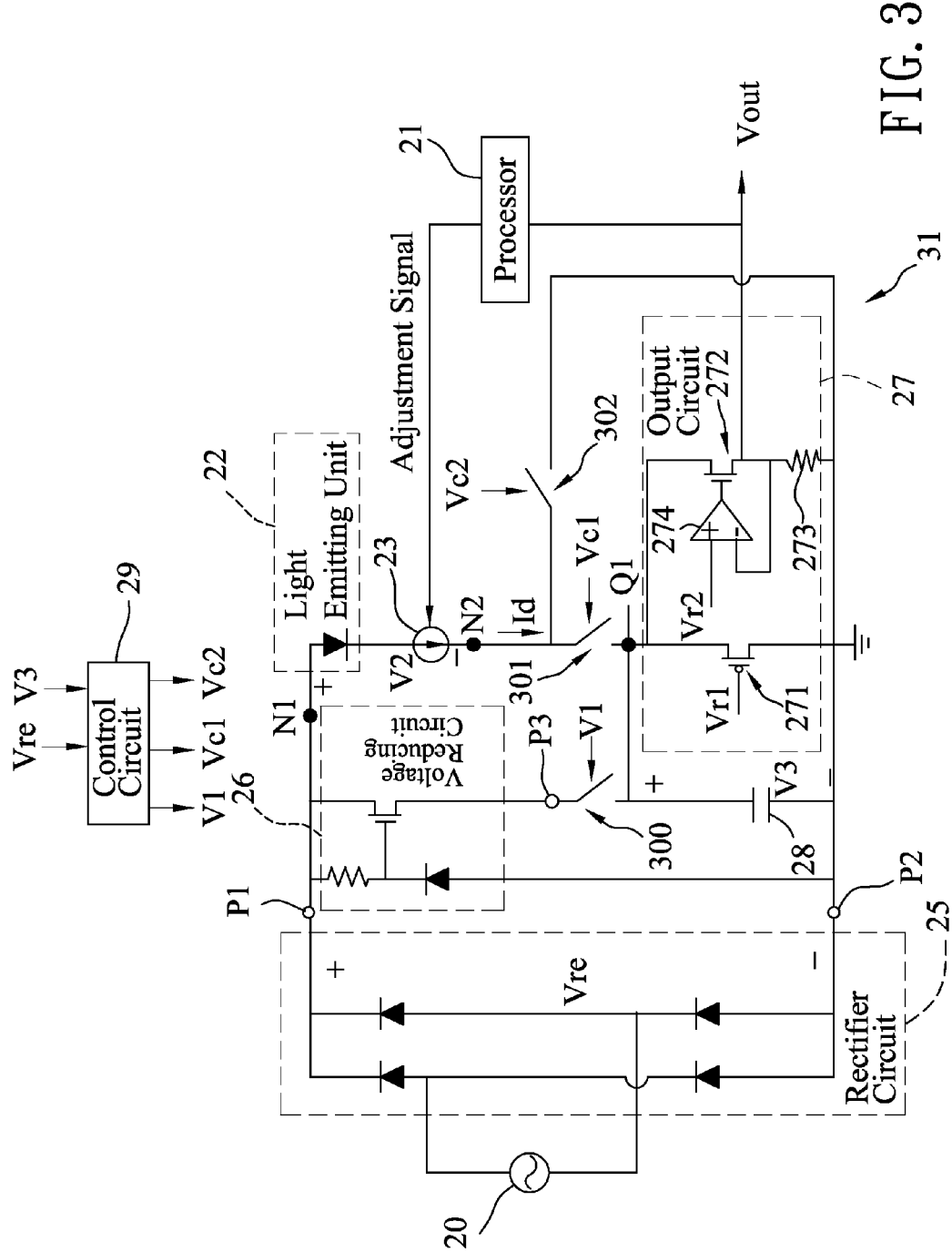
FIG. 3 is a schematic circuit diagram illustrating a second preferred embodiment of a voltage conversion device of a light emitting system according to the present invention.

FIG. 3 shows a light emitting system that includes the second preferred embodiment of the voltage conversion device 31 of this invention, which differs from the first preferred embodiment in that: the voltage conversion device 31 further includes a first current switch 301 controlled using a first control signal Vc1 to make or break electrical connection, and a second current switch 302 controlled using a second control signal Vc2 to make or break electrical connection; and the control circuit 29 further generates the first and second control signals Vc1, Vc2 according to the rectified voltage Vre and the voltage V3.

The first current switch 301 is coupled between the node Q1 and the node N2. The second current switch 302 is coupled between the second rectifier output P2 and the node N2.

During operation, the second preferred embodiment has four states, where state I and state II are substantially the same as those described in the first preferred embodiment (i.e., the first current switch 301 is closed and the second current switch 302 is open), and will not be described herein for the sake of brevity.

State III: When the rectified voltage Vre is greater than the first value and that the voltage V3 is smaller than the second value, the control circuit 29 further controls the first current switch 301 to make electrical connection, and further controls the second current switch 302 to break electrical connection. At this time, the circuit condition is substantially the same as state III of the first preferred embodiment, and will not be described herein for the sake of brevity.

State IV: When the rectified voltage Vre is greater than the first value and the voltage V3 is greater than the second value, the control circuit 29 further controls the first current switch 301 to break electrical connection, and further controls the second current switch 302 to make electrical connection.

At this time, the driving current Id directly flows to the ground, and the capacitor 28 discharges via the output circuit 27, so that the input voltage received by the output circuit 27 is equal to the voltage V3, and the output circuit 27 generates the DC output voltage Vout according to the voltage V3 across the capacitor 28, the voltage V3 having an initial magnitude associated with the difference between the rectified voltage Vre and the voltage V2. In this manner, damage to the output circuit 27 due to high voltage thereacross may be prevented.

Therefore, the second preferred embodiment not only achieves the same effect as the first preferred embodiment, but also achieves a higher utilization rate of the light emitting unit 22 (i.e., a time ratio of light emission by the light emitting unit 22) since the driving current Id directly flows to the ground at state IV, which results in the second preferred embodiment requiring lower rectified voltage Vre (i.e., Vre is only required to be greater than the first value) to turn on the light emitting unit 22 compared to that required by the first preferred embodiment (i.e., Vre has to be greater than a sum of the first and second values).

Figure 7:
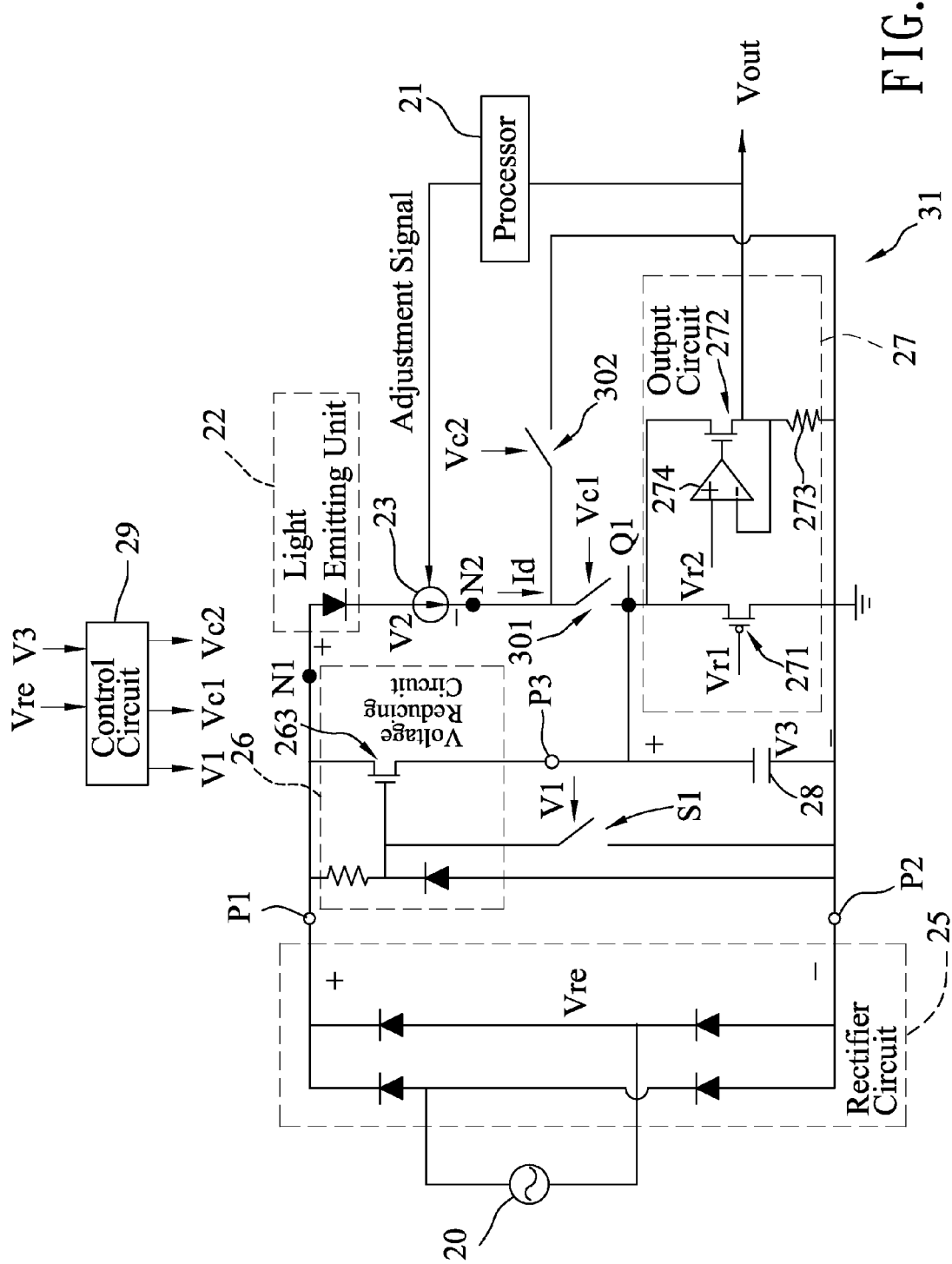
FIG. 7 is a schematic circuit diagram illustrating a modification of the second preferred embodiment.

Referring to FIG. 7, a modification of the second preferred embodiment is shown to have a switch S1 coupled between the control terminal of the transistor 263 and the second rectifier output P2, and to have the switch 300 omitted by connecting the node P3 to the node Q1. The switch S1 is responsive to the switch signal V1 to make or break electrical connection. When the switch S1 makes electrical connection, the control terminal of the transistor 263 is grounded, and the voltage reducing circuit 26 does not charge the capacitor 28. When the switch S1 breaks electrical connection, the circuit of the modification is equivalent to the second preferred embodiment with the switch 300 making electrical connection. Therefore, the switch S1 of this modification may achieve the same function as that of the switch 300 of the second preferred embodiment.

Figure 4:
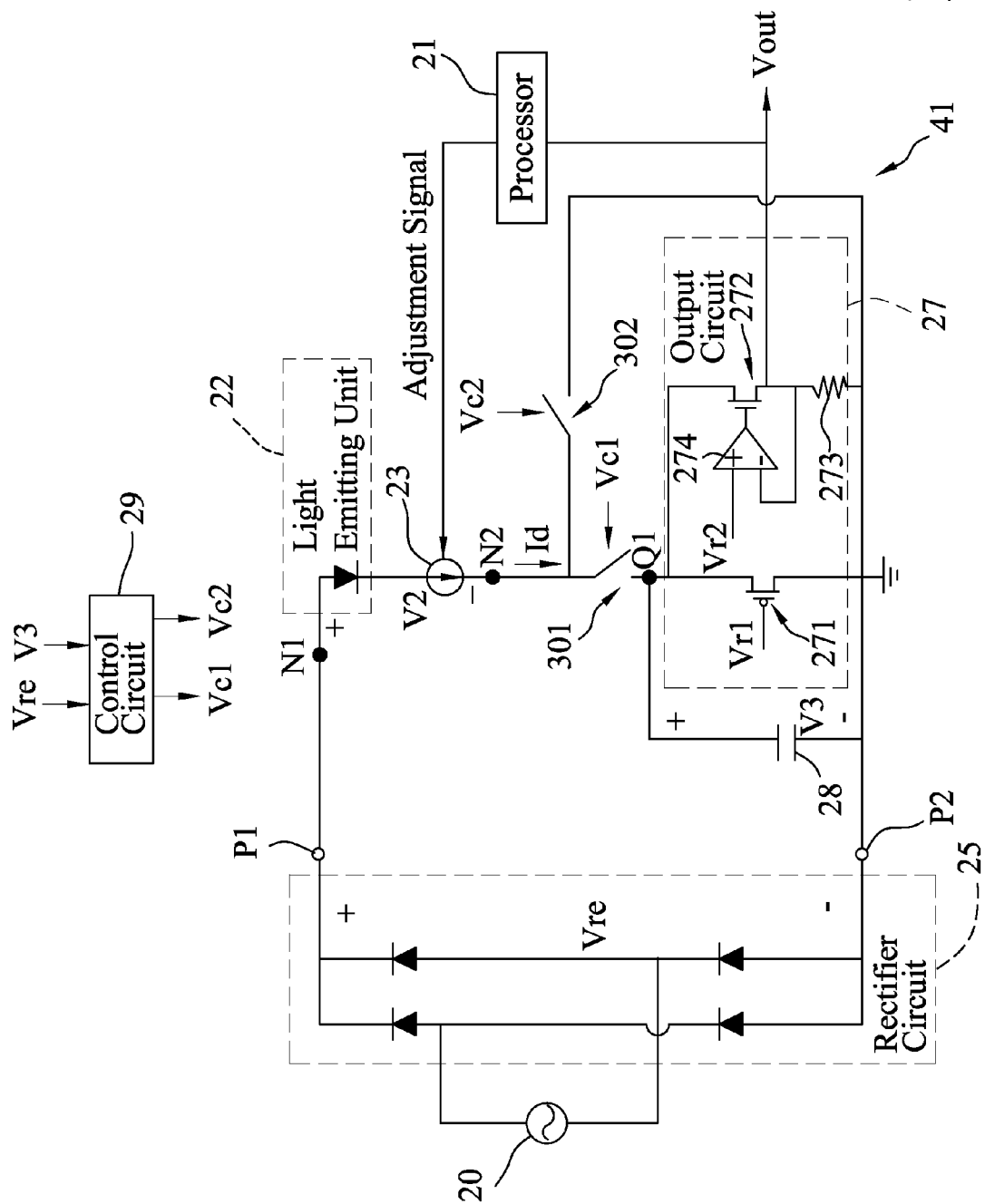
FIG. 4 is a schematic circuit diagram illustrating a third preferred embodiment of a voltage conversion device of a light emitting system according to the present invention.

FIG. 4 shows a light emitting system that includes the third preferred embodiment of the voltage conversion device 41 of this invention, which differs from the second preferred embodiment in that: the voltage reducing circuit 26 and the switch 300 (see FIG. 3) are omitted.

During operation, the third preferred embodiment has two states, where the two states are substantially the same as state III and state IV described in the second preferred embodiment, and will not be described herein for the sake of brevity.

Therefore, in addition to the advantages of the second preferred embodiment (e.g., higher conversion efficiency, longer service life of the light emitting unit 22, and preventing waste of current), the third preferred embodiment does not require the voltage reducing circuit 26 since the node Q1 is coupled to the node N2 through the first current switch 301, so as to eliminate damage issue of the voltage reducing circuit that may occur in the second preferred embodiment due to high power consumption, and to further prolong service life of the voltage conversion device 41.

Figure 5:
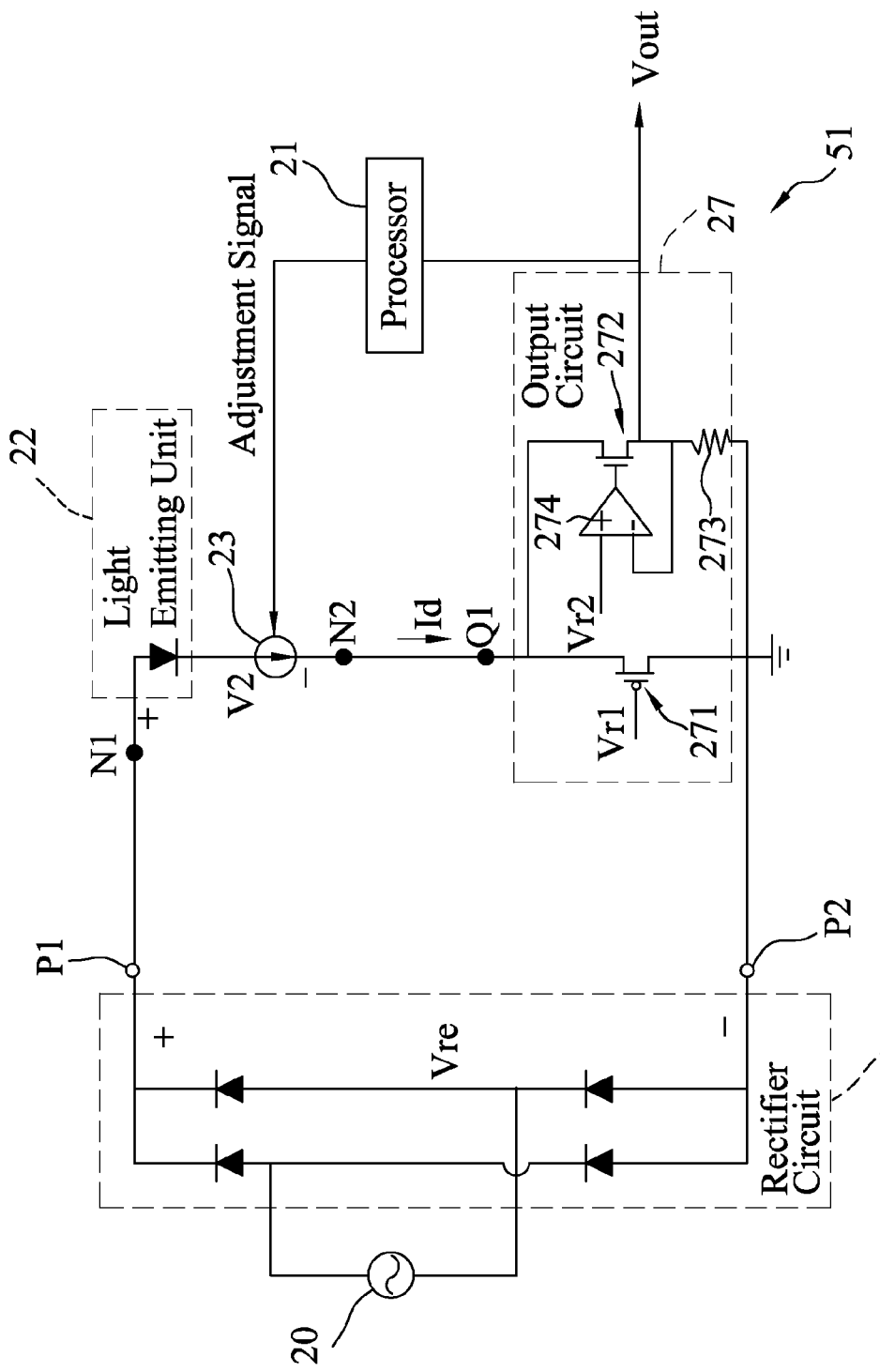
FIG. 5 is a schematic circuit diagram illustrating a fourth preferred embodiment of a voltage conversion device of a light emitting system according to the present invention.

FIG. 5 shows a light emitting system that includes the fourth preferred embodiment of the voltage conversion device 51 of this invention, which differs from the third preferred embodiment in that: the capacitor 28, the control circuit 29, and the first and second current switches 301, 302 (see FIG. 4) are omitted, and the node Q1 is directly coupled to the node N2.

During operation, when the rectified voltage Vre is high enough such that the driving current Id flows into the output circuit 27 through the series connection of the light emitting unit 22 and the variable current source 23, the input voltage of the output circuit 27 is associated with the difference between the rectified voltage Vre and the voltage V2, and the output circuit 27 outputs the DC output voltage Vout that is provided to the processor 21 according to the input voltage of the output circuit 27.

Through such a circuit design, the fourth embodiment may also have the advantages of the third preferred embodiment.

It should be noted that, the DC output voltage Vout is outputted to the processor 21 in the first to fourth embodiments, but the present invention should not be limited thereto.

Figure 6:
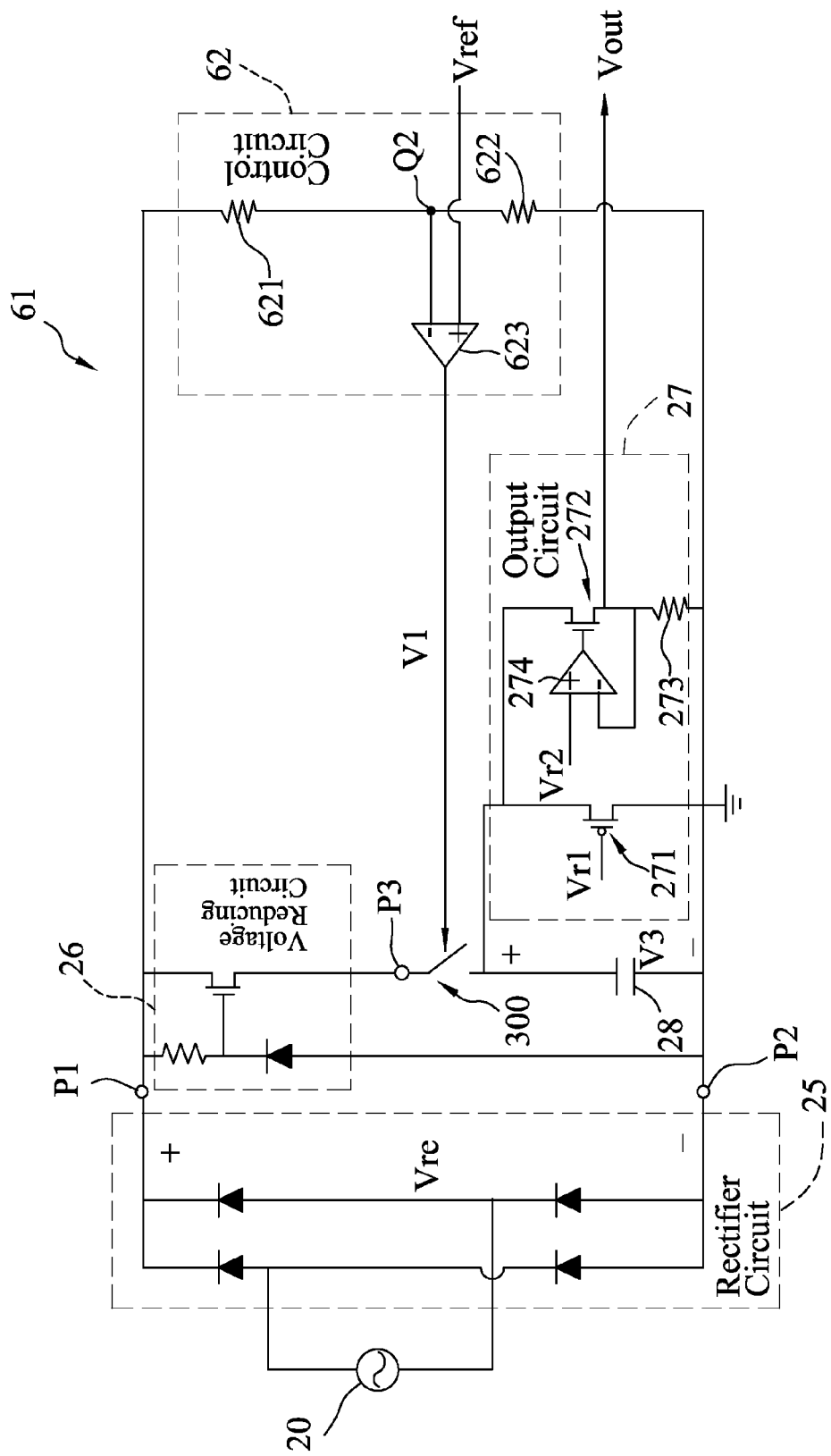
FIG. 6 is a schematic circuit diagram illustrating a sixth preferred embodiment of a voltage conversion device according to the present invention.

FIG. 6 shows a fifth preferred embodiment of the voltage conversion device 61 of this invention, which differs from the first preferred embodiment in that: the control circuit 62 replaces the control circuit 29 of the first preferred embodiment (see FIG. 2).

The control circuit 62 is coupled to the switch 300 and to the first and second rectifier outputs P1, P2, generates the switch signal V1 according to the rectified voltage Vre and a predetermined reference voltage Vref, and includes a first resistor 621, a second resistor 622 and an operational amplifier 623.

The first resistor 621 and the second resistor 622 are coupled in series between the first rectifier output P1 and the second rectifier output P2 for receiving the rectified voltage Vre.

The operational amplifier 623 has a first terminal receiving the predetermined reference voltage Vref, a second terminal coupled to a common node Q2 of the first resistor 621 and the second resistor 622, and an output coupled to the switch 300 for controlling the switch 300 to make or break electrical connection (i.e., by outputting the switch signal V1). In this embodiment, the first and second terminals of the operational amplifier 623 are a non-inverting terminal (+) and an inverting terminal (−), respectively.

During operation, the fifth preferred embodiment has two states as follows.

State I: When a voltage at the node Q2 is smaller than the predetermined reference voltage Vref, the switch signal V1 outputted by the control circuit 62 causes the switch 300 to make electrical connection. The circuit condition of the voltage conversion device 61 is substantially the same as state I described in the first preferred embodiment, and will not be described herein for the sake of brevity.

State II: When the voltage at the node Q2 is greater than the predetermined reference voltage Vref, the switch signal V1 outputted by the control circuit 62 causes the switch 300 to break electrical connection. When the voltage V3 is also greater than the second value, the circuit condition of the voltage conversion device 61 is substantially the same as state II described in the first preferred embodiment, and will not be described herein.

Since the control circuit 62 generates the switch signal V1 to control the switch 300 to make or break electrical connection, damage issue of the voltage reducing circuit 26 due to high power consumption may be alleviated, thereby prolonging service life of the voltage conversion device 61.

To sum up, the above embodiments may have the following advantages:

1. Low power consumption and long service life: Through control of the switch 300 to make or break electrical connection according to the circuit condition, damage issue of the voltage reducing circuit 26 due to high power consumption may be alleviated, thereby prolonging service life of the voltage conversion devices 24, 31, 61. In addition, since the output circuit 27 may be coupled to the node N2 through the switch 301 or directly, the voltage reducing circuit 26 may be omitted in some embodiments, so that damage issue of the voltage reducing circuit 26 due to high power consumption may be eliminated, thereby prolonging service life of the voltage conversion device 41, 51.

2. High conversion efficiency: Since the output circuit 27 may be coupled to the node N2 to obtain the input voltage, the DC output voltage Vout may be higher compared to that outputted by the output circuit 17 of the aforementioned conventional light emitting system 1, thereby promoting conversion efficiency of the voltage conversion device 24, 31, 41.

Figure 1:
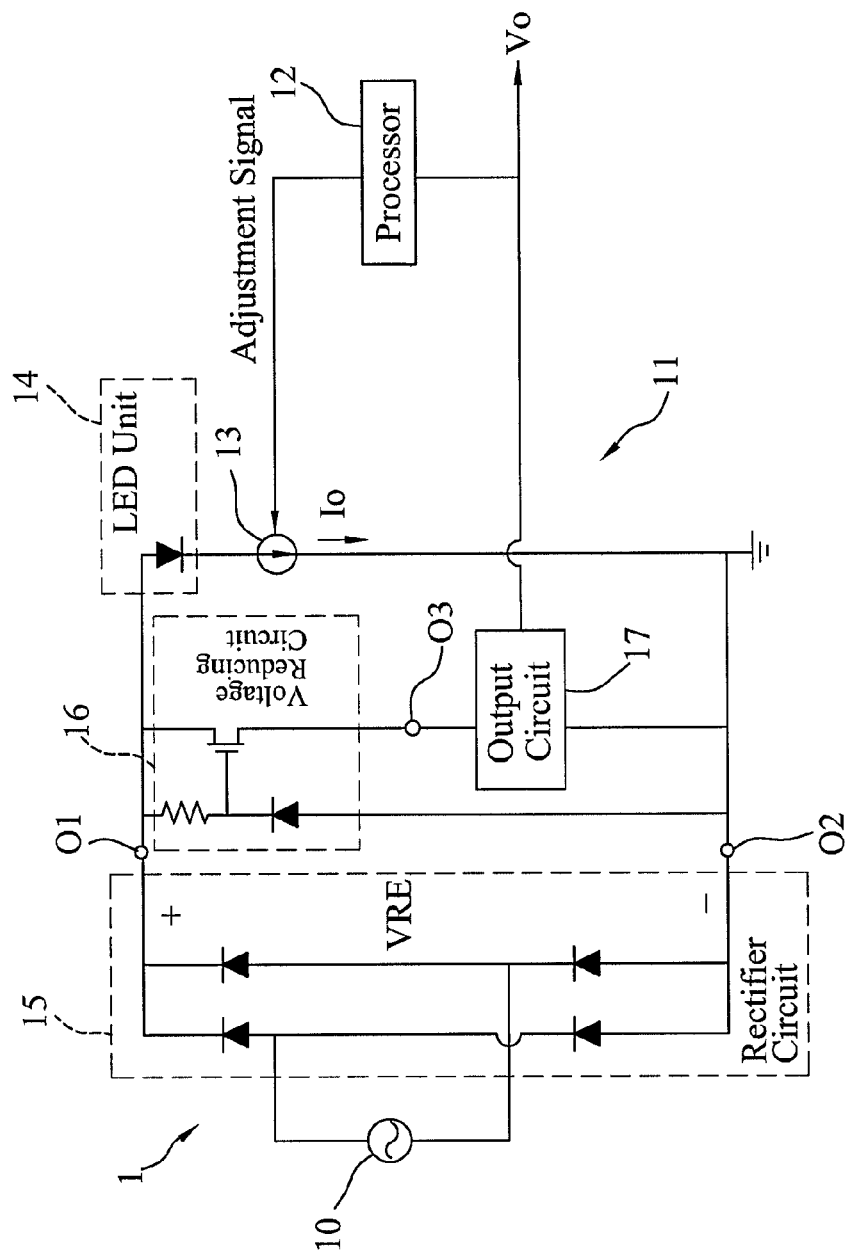
FIG. 1 is a schematic circuit diagram illustrating a conventional light emitting system.

3. Preventing waste of current: Through current flow of the driving current Id into the output circuit 27 and the capacitor 28 instead of directly to the ground as described in the prior art (see FIG. 1), waste of current may be alleviated.

4. Promotion of utilization rate of the light emitting unit 22: Since the driving current Id directly flows to ground when the first current switch 301 is open and the second current switch 302 is closed, utilization rate of the light emitting unit 22 may thus be promoted.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light emitting system comprising:
  a series connection of a light emitting unit and a variable current source, said variable current source being disposed to receive an adjustment signal and generating a driving current to drive said light emitting unit according to the adjustment signal; and
  a voltage conversion device including:
    a rectifier circuit disposed to receive an alternating-current (AC) voltage, and having a first rectifier output coupled to one end of the series connection of said light emitting unit and said variable current source, and a second rectifier output, said rectifier circuit being configured to rectify the AC voltage for generating a rectified voltage across said first rectifier output and said second rectifier output; and
    an output circuit coupled between said second rectifier output and another end of the series connection of said light emitting unit and said variable current source, having an input disposed to receive an input voltage associated with a difference between the rectified voltage and a voltage across the series connection of said light emitting unit and said variable current source, and configured to generate a direct-current (DC) output voltage according to the input voltage.

2. The light emitting system as claimed in claim 1, further comprising a processor coupled to said output circuit for receiving the DC output voltage and operable to generate the adjustment signal, wherein said output circuit includes:
  a first transistor having a first terminal serving as said input of said output circuit and coupled to said another end of the series connection of said light emitting unit and said variable current source, a second terminal coupled to said second rectifier output, and a control terminal disposed to receive a first voltage;

an operational amplifier having a first input disposed to receive a second voltage, a second input, and an output;

a second transistor having a first terminal coupled to said first terminal of said first transistor, a second terminal coupled to said second input of said operational amplifier, and a control terminal coupled to said output of said operational amplifier; and a resistor coupled between said second terminal of said second transistor and said second rectifier output;

wherein the DC output voltage is outputted at said second terminal of said second transistor.

3. The light emitting system as claimed in claim 1, wherein said voltage conversion device further includes:

a voltage reducing circuit coupled between said first rectifier output and said second rectifier output for receiving the rectified voltage, having an output, and configured to generate at said output thereof a reduced voltage associated with the rectified voltage; and a switch coupled between said output of said voltage reducing circuit and said input of said output circuit, and configured to make or break electrical connection between said output of said voltage reducing circuit and said input of said output circuit.

4. The light emitting system as claimed in claim 3, wherein said voltage conversion device further includes:

a control circuit coupled to said switch and said rectifier circuit, and configured to control said switch to break electrical connection when the rectified voltage is greater than a first value.

5. The light emitting system as claimed in claim 4, further comprising a processor coupled to said output circuit for receiving the DC output voltage and operable to generate the adjustment signal;

wherein said input of said output circuit is coupled to said another end of the series connection of said light emitting unit and said variable current source, and said voltage conversion device further includes a capacitor coupled between said input of said output circuit and said second rectifier output;

wherein said control circuit is further coupled to said capacitor, and is configured to control said switch to break electrical connection when the rectified voltage is not greater than the first value, and a voltage across said capacitor is greater than a second value; and wherein said control circuit is further configured to control said switch to make electrical connection when the rectified voltage is not greater than the first value, and the voltage across said capacitor is not greater than the second value.

6. The light emitting system as claimed in claim 4, wherein said output circuit includes:

a first transistor having a first terminal serving as said input of said output circuit and coupled to said another end of the series connection of said light emitting unit and said variable current source, a second terminal coupled to said second rectifier output, and a control terminal disposed to receive a first voltage;

an operational amplifier having a first input disposed to receive a second voltage, a second input, and an output;

a second transistor having a first terminal coupled to said first terminal of said first transistor, a second terminal coupled to said second input of said operational amplifier, and a control terminal coupled to said output of said operational amplifier; and a resistor coupled between said second terminal of said second transistor and said second rectifier output;

wherein the DC output voltage is outputted at said second terminal of said second transistor.

7. The light emitting system as claimed in claim 4, wherein said voltage conversion device further includes:

a first current switch configured to make or break electrical connection between said input of said output circuit and said another end of the series connection of said light emitting unit and said variable current source;

a second current switch configured to make or break electrical connection between said second rectifier output and said another end of the series connection of said light emitting unit and said variable current source; and a capacitor coupled between said input of said output circuit and said second rectifier output;

wherein said control circuit is further coupled to said first current switch, said second current switch, and said capacitor, and is configured to control said first current switch to break electrical connection and to control said second current switch to make electrical connection when the rectified voltage is greater than the first value, and a voltage across said capacitor is greater than a second value; and wherein said control circuit is further configured to control said first current switch to make electrical connection and to control said second current switch to break electrical connection when the rectified voltage is greater than the first value, and the voltage across said capacitor is smaller than the second value.

8. The light emitting system as claimed in claim 7, wherein said control circuit is further configured to control said switch to break electrical connection when the rectified voltage is not greater than the first value, and the voltage across said capacitor is greater than the second value; and wherein said control circuit is further configured to control said switch to make electrical connection when the rectified voltage is not greater than the first value, and the voltage across said capacitor is not greater than the second value.

9. The light emitting system as claimed in claim 1, wherein said voltage conversion device further includes:

a first current switch configured to make or break electrical connection between said input of said output circuit and said another end of the series connection of said light emitting unit and said variable current source; and a second current switch configured to make or break electrical connection between said second rectifier output and said another end of the series connection of said light emitting unit and said variable current source;

wherein said first current switch and said second current switch are configured so as not to make electrical connection at the same time.

10. The light emitting system as claimed in claim 9, wherein said voltage conversion device further includes:

a capacitor coupled between said input of said output circuit and said second rectifier output; and a control circuit coupled to said first current switch, said second current switch, said rectifier circuit, and said capacitor, and configured to control said first current switch to make electrical connection and to control said second current switch to break electrical connection when the rectified voltage is greater than a first value, and a voltage across said capacitor is smaller than a second value;

wherein said control circuit is further configured to control said first current switch to break electrical connection and to control said second current switch to make electrical connection when the rectified voltage is greater than the first value, and the voltage across said capacitor is greater than the second value.

11. The light emitting system as claimed in claim 10, further comprising a processor coupled to said output circuit for receiving the DC output voltage and operable to generate the adjustment signal, wherein said output circuit includes:

a first transistor having a first terminal serving as said input of said output circuit and coupled to said another end of the series connection of said light emitting unit and said variable current source, a second terminal coupled to said second rectifier output, and a control terminal disposed to receive a first voltage;

an operational amplifier having a first input disposed to receive a second voltage, a second input, and an output;

a second transistor having a first terminal coupled to said first terminal of said first transistor, a second terminal coupled to said second input of said operational amplifier, and a control terminal coupled to said output of said operational amplifier; and a resistor coupled between said second terminal of said second transistor and said second rectifier output;

wherein the DC output voltage is outputted at said second terminal of said second transistor.

* * * * *